July 23, 1946.  R. R. MERNER  2,404,723
PREPARATION OF POLYMER SOLUTIONS
Filed Nov. 10, 1944
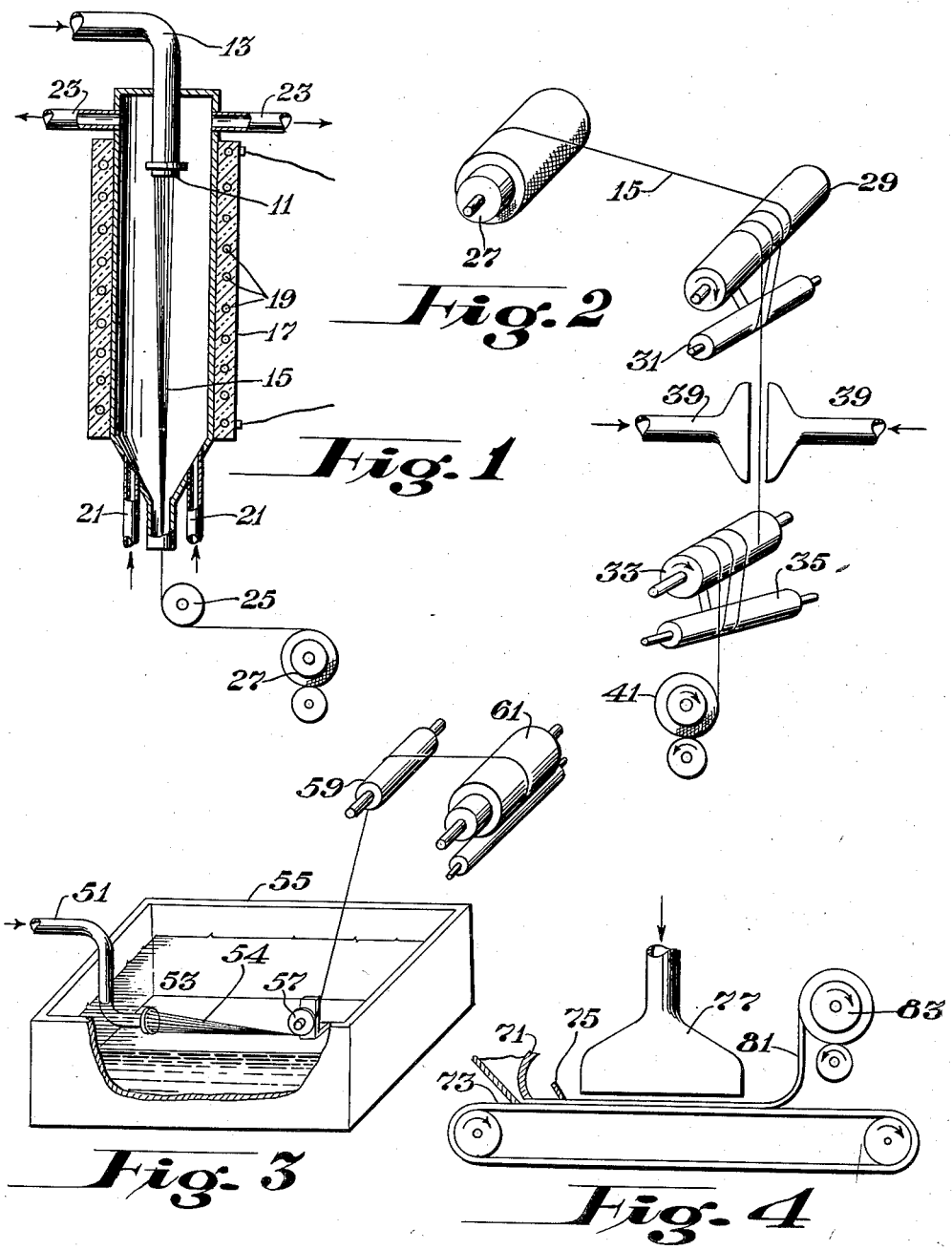

Patented July 23, 1946

2,404,723

UNITED STATES PATENT OFFICE 2,404,723

PREPARATION OF POLYMER SOLUTIONS

Richard R. Merner, Deerfield, Ill., assignor to E. I. du Pont de Nemours & Company, Wilmington, Del., a corporation of Delaware Application November 10, 1944, Serial No. 562,857

11 Claims. (Cl. 260—32)

This invention relates to a new composition of matter and shaped articles produced therefrom. More particularly, this invention relates to an organic solvent solution of polyacrylonitrile, i. e. polymerized acrylonitrile or polymerized vinyl cyanide $(CH_2=CHCN)_x$, and copolymers and interpolymers of acrylonitrile in which at least 85% by weight of the polymer is acrylonitrile; and the production of shaped articles from said organic solvent solution of said polymers of acrylonitrile.

Polyacrylonitrile, and copolymers and interpolymers of acrylonitrile with other polymerizable substances, for example vinyl or acrylic compounds in which at least 85% by weight of the polymer is acrylonitrile have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts, numerous attempts have been made to form these polymeric materials into yarns, films and other shaped articles.

The copending application of George H. Latham, Serial No. 562,012, filed November 4, 1944 discloses solutions of polyacrylonitrile in dimethyl carbamyl compounds and the production of extruded and otherwise shaped articles and structures from such solutions. The abovesaid application of George H. Latham represents the first successful dissolution of polyacrylonitrile in a solvent to produce a solution which is suitable for the production of commercially useful textile yarns or wrapping tissue films, and similar tough, flexible structures.

The present application relates to a similarly satisfactory dissolution of polyacrylonitrile in an organic solvent taken from a different class of organic compounds and the polyacrylonitrile solutions produced thereby are similarly satisfactory for the production of tough, flexible, dense, colorless yarns and films which are suitable for use in practically all general commercial applications of such products.

It has been known heretofore that concentrated, aqueous solutions of inorganic salts such as lithium bromide, zinc chloride and sodium sulfocyanide will dissolve polyacrylonitrile and it has been proposed (Rein U. S. Patent No. 2,140,921) to employ the resulting solutions in the formation of yarns and films. However, it has been found substantially impossible to use the resulting compositions in such a manner. Their extrusion into coagulating baths of the type proposed (including such non-solvents for acrylonitrile as water, dilute acid, dilute salt solutions, etc.) result in the formation of shaped articles that contain large amounts of the inorganic salt of the proposed solvent. These salts are distributed throughout the structure and destroy the continuity of the polyacrylonitrile phase and the structure possesses poor physical properties. Removal of these salts, when possible, results in the formation of a porous, spongy, weak, undesirable structure that is very brittle and completely unsuited for use as a yarn or film. Moreover, when it is attempted to form a multifilament yarn by extruding, for example the proposed aqueous sodium sulfocyanide polyacrylonitrile composition, into a dilute acid bath, it is found that the individual filaments obtained stick together to form an essentially monofilament structure that is extremely brittle and cannot be bent or worked without breaking.

U. S. Patent No. 2,167,537 to Tobis points out that certain copolymers of acrylonitrile and an acrylic acid ester (those copolymers containing not more than 65% of acrylonitrile) are soluble in mixtures of organic solvents such as dioxan, monochlorbenzene, cyclohexanone, etc. However, these liquids are incapable of dissolving or even swelling polyacrylonitrile or copolymers of acrylonitrile containing higher percentages of acrylonitrile, i. e. acrylonitrile polymers of the type with which this invention is concerned. As previously mentioned, polymers containing such high percentages (at least 85% by weight) of acrylonitrile are especially desirable for use because of their good physical properties and excellent chemical resistance.

It has also been proposed (Rein U. S. Patent No. 2,117,210) to dissolve polyacrylonitrile in molten quaternary ammonium salts such as benzyl pyridinum chloride, an ionizable salt. Although the resulting solution can allegedly be used to form yarns or films of polyacrylonitrile, the solution itself is dark red to brown in color, indicating that some decomposition of the polyacrylonitrile or some reaction between the polyacrylonitrile and the molten salt has probably taken place. Such solutions are not satisfactory for the production of commercially useful, shaped articles of polyacrylonitrile. Here again, it has been found practically impossible to obtain filamentary structures such as yarns from the composition. Films or filaments, when obtainable, are extremely brittle; they are highly colored and very weak, presumably because of the presence within them of residual quaternary ammonium salt. Removal of this salt is difficult and the resulting structures contain numerous and large voids that make the structures substantially useless for commercial purposes.

It is therefore an object of this invention to dissolve polyacrylonitrile or a copolymer or interpolymer of acrylonitrile in which at least 85% by weight of the polymer is acrylonitrile, in a solvent which does not react with or decompose the polymer and which may be substantially completely removed from the structures formed of such a solution.

It is another object of this invention to produce a solution of polyacrylonitrile or a copolymer or interpolymer of acrylonitrile in which at least 85% by weight of the polymer is acrylonitrile, in a solvent which does not react with or decompose the polymer, the solution being suitable for the formation of commercially useful, void free articles of polyacrylonitrile, for example yarns which are suitable as textile yarns and films which are suitable as wrapping tissue.

It is another object of this invention to produce a solution of polyacrylonitrile, or a copolymer or interpolymer of acrylonitrile in which at least 85% by weight of the polymer is acrylonitrile, in a volatile organic solvent, which solution is stable over extended periods of time and is eminently suited for use in the manufacture of shaped articles such as yarns, films, tubes, straws, artificial horsehair, bristles and ribbons, or when highly concentrated, for use in the manufacture of molded articles.

It is a still further object of this invention to produce shaped articles and structures of polyacrylonitrile, or copolymers or interpolymers of acrylonitrile in which at least 85% by weight of the polymer is acrylonitrile.

It is still another object of this invention to produce a shaped article or structure of polyacrylonitrile or copolymers or interpolymers of acrylonitrile in which at least 85% by weight of the polymer is acrylonitrile, for example a yarn, film, tube, bristle or the like which is tough, flexible, tenacious and free from voids.

Other objects of the invention will appear hereinafter.

The objects of the invention may be accomplished in general by dissolving polyacrylonitrile, or a copolymer or interpolymer of acrylonitrile in which at least 85% by weight of the polymer is acrylonitrile in di-substituted formamide of the type more specifically defined hereinafter.

If the solvent has a relatively low boiling point (less than about 250° C.), the solution of polyacrylonitrile may then be formed into a shaped structure, for example a yarn or film and the solvent removed from the shaped structure. When the solvent is relatively non-volatile and has a boiling point of about 300° C. or more, shaped articles may be made from the solution and at least a portion of the solvent may be retained therein as a plasticizer for the articles.

It has been recognized in recent years that under certain conditions, an atom of hydrogen is attracted by rather strong forces to two atoms instead of only one so that it may be considered to be acting as a bond between them. This is called the hydrogen bond.

The difficulty of dissolving polymers containing at least 85% by weight of acrylonitrile is due to the presence within the molecules of strong hydrogen-bonding forces and in order to dissolve one of these polymers, it is necessary to find a material which will undergo hydrogen bonding with the active hydrogen-bonding groups of the polymer molecules and thus weaken the strong hydrogen bond within the polymer molecules and cause the hydrogen-bonding forces to be shared between molecules of the polymer and the solvent. In this manner, it is possible to form a molecular dispersion of the polymer within the solvent and thus form a solution.

However, the strength of the hydrogen-bonding capacity cannot be taken as the sole criterion as to whether or not a compound will function to dissolve an acrylonitrile polymer. It is also necessary that, in order to function as a solvent for an acrylonitrile polymer, the compound contain certain groups which will be capable of satisfactorily sharing a hydrogen bonding force with the particular active group of the acrylonitrile polymer. In most instances, these groups require the presence of a hydrogen atom on a carbon atom to which the group is attached (designated as an alpha-hydrogen atom). Such groups as require the alpha-hydrogen atom are ineffective to impart solvent power if the alpha-hydrogen atom is missing.

It has now been found that groups capable of conferring solvent power include dimethyl carbamyl

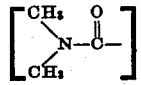

formyl imido

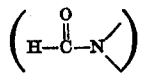

cyano (—C≡N), thiocyano (—S—C≡N) and sulfoxy

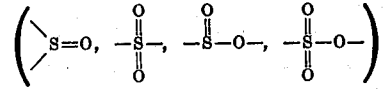

groups, provided however that the cyano, thiocyano and sulfoxy groups require attachment (through their respective unsatisfied carbon and sulfur valences) to a carbon atom which is in turn attached to at least one hydrogen atom (alpha-hydrogen) in order to render them effective. The dimethyl carbamyl and the formyl imido groups are effective in the absence of the alpha-hydrogen atom. (It is possible that they contain the equivalent of an alpha-hydrogen atom within their own structures.) Thus, the groups dimethyl carbamyl

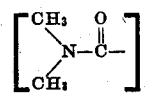

formyl imido (HCON<), cyanomethylene (>CHCN)

thiocyanomethylene (>CHSCN) and sulfoxymethylene (>CHSO—, >CHSO₂—, >CHSOO—, and >CHSO₂O—) shall hereinafter be referred to as solvogenic groups and compounds containing them are frequently capable of dissolving an acrylonitrile polymer containing at least 85% by weight of acrylonitrile.

In the event that two or more groups requiring the presence of an alpha-hydrogen atom in order to render them solvogenic are attached to the same carbon atom and compete with each other for an available alpha-hydrogen atom, the sulfoxy group, the cyano group and the thiocyano group take preference over each other in the order named to form the solvogenic group, the lower ranking group or groups present assuming merely the nature of an inert substituent on the carbon atom.

It has furthermore been found that compounds containing the above-mentioned solvogenic groups will be solvents for the above-mentioned polymers only if the carbon content of the compound be within certain limits as given below. If the ratio of carbon to solvogenic groupings is maintained within the said limits, the compounds will retain solvent properties of the polymer even though the molecule be of considerable size and complexity. The solvent power of the compound for acrylonitrile polymers is increased if additional solvogenic groups are present in the molecular structure of the compound, the effect of these groups being additive.

It has now been found that formamide (formyl imido) derivatives which are fusible without decomposition, preferably those having a melting point below 250° C., in which both valences of the N-atom of the amide are satisfied by hydrocarbon carbon atoms and which are embraced by the following empirical formula will dissolve polyacrylonitrile and copolymers and interpolymers in which at least 85% by weight of the polymer is acrylonitrile:

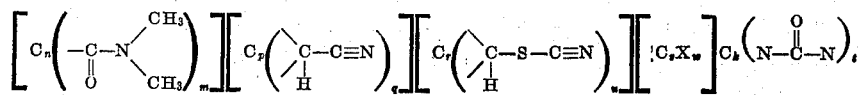

wherein X represents

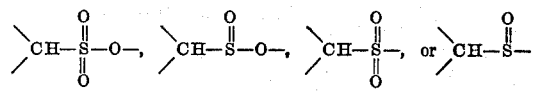

the free valance of the sulfoxy group being attached also to carbon;
$t$ is an integer equal to or greater than 1;
$m$, $q$, $u$ and $w$ are integers equal to or greater than zero;
$m+q+u+w+t$ is equal to or greater than 2;
$n$, $p$, $r$, $v$ and $k$ are integers equal to or greater than zero;

provided always that $k/t$ is equal to or less than 3;
$v/w$ is equal to or less than 2;
$r/u$ is equal to or less than 0.5;
$p/q$ is equal to or less than 1.5 and
$n/m$ is equal to or less than 1.5.

These compounds are not salts but may be cyclic or acyclic and may possess one or more ethylenic or acetylenic linkages. Valences other than those contained in carbon-to-carbon linkages and not shown as satisfied in the above formula must be satisfied by hydrogen, halogen, oxygen or bivalent sulfur atoms or by hydroxyl, thiol, cyano, thiocyano or sulfoxy groups; the total number of such halogen, oxygen, hydroxyl and thiol substituents not exceeding one half the sum $m+q+u+w+t$ and the number of cyano, thiocyano and sulfoxy groups not exceeding the sum $m+q+u+w+t$. The respective tolerances of one half $m+q+u+w+t$ and of $m+q+u+w+t$ are independent of each other and members of both groups may be present in the molecule up to their group tolerances. The substituent oxygen or sulfur atoms may appear in the compound as bivalent groups either as a side group (carbonyl or thiocarbonyl) or within the chain (ether or thioether) as the case may be.

Representative compounds coming within the scope of the above formula and suitable for use as solvents for the above-mentioned acrylonitrile polymers include:

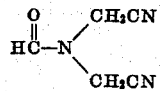

N,N-bis(cyanomethyl) formamide

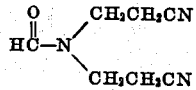

N,N-bis (beta-cyanoethyl) formamide

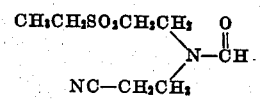

N-(beta-cyanoethyl)-N-(beta-ethylsulfonylethyl) formamide

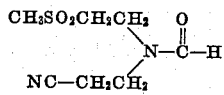

N-(beta-cyanoethyl)-N-(beta-methylsulfonylethyl) formamide

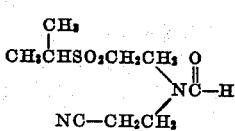

N-(beta-cyanoethyl)-N-(beta-isopropylsulfonylethyl) formamide

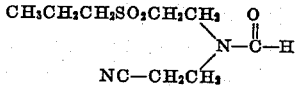

N-(beta-cyanoethyl)-N-(beta-n-propylsulfonylethyl) formamide

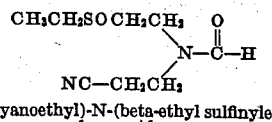

N-(beta-cyanoethyl)-N-(beta-ethyl sulfinylethyl) formamide

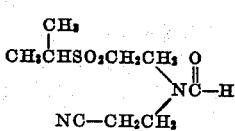

N-(beta-cyanoethyl)-N-(beta-methylsulfinylethyl) formamide

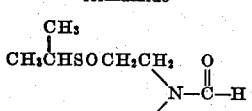

N-(beta-cyanoethyl)-N-(beta-isopropylsulfinylethyl) formamide

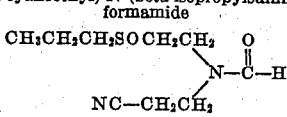

N-(beta-cyanoethyl)-N-(beta-n-propylsulfinylethyl) formamide

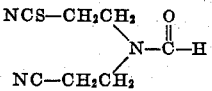

N-(beta-cyanoethyl)-N-(beta-thiocyanoethyl) formamide

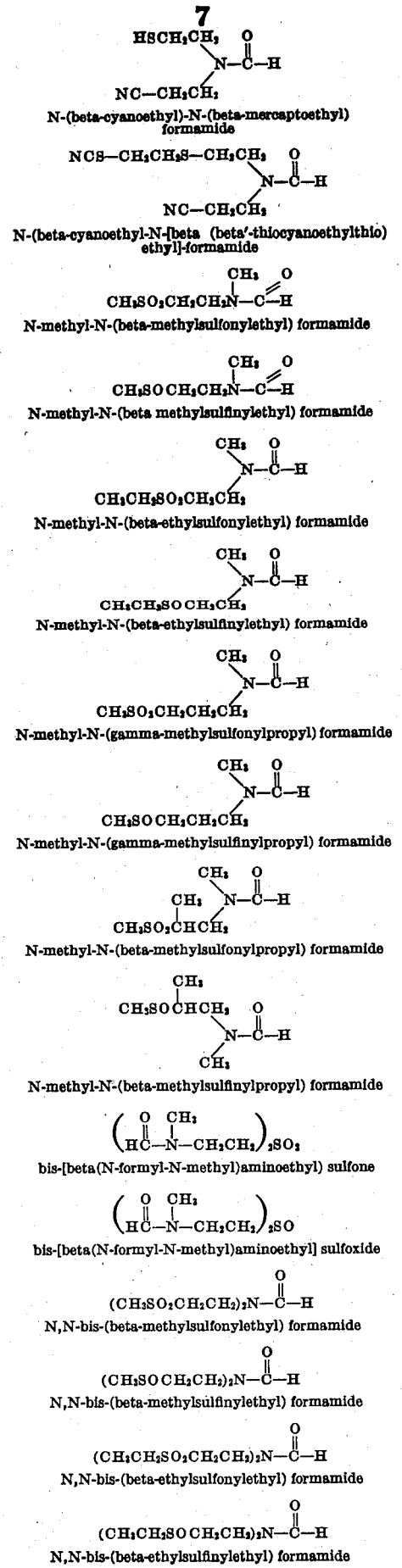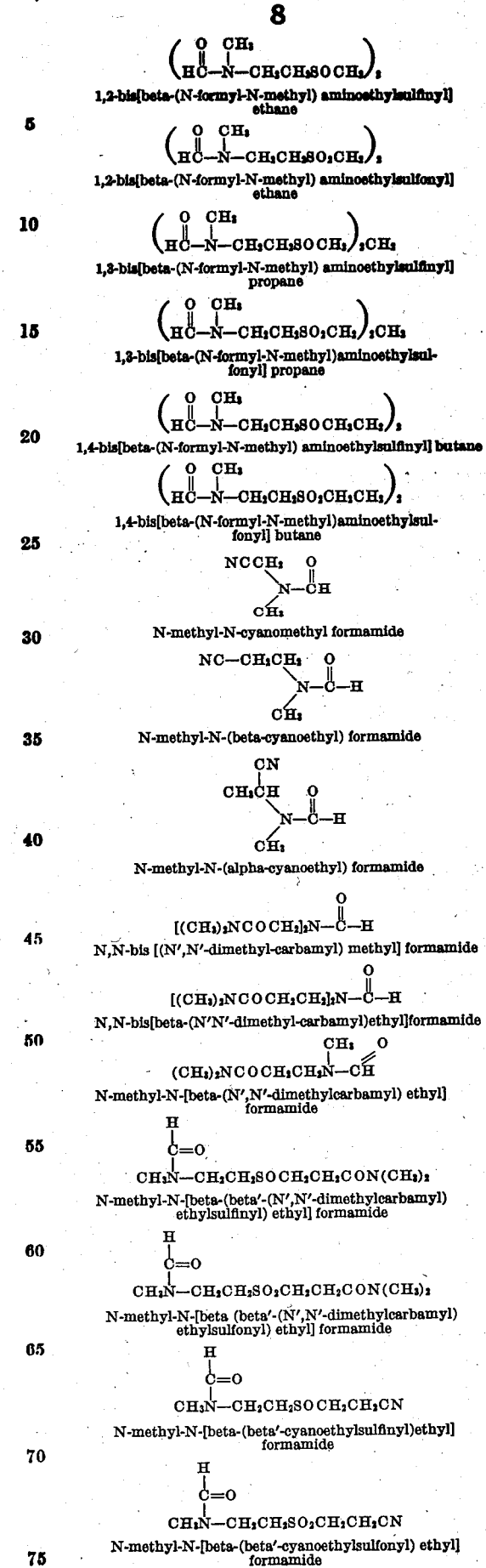

$$\underset{\mathrm{CH_3N-CH_2CH_2SOCH_2CH_2CH_2CN}}{\overset{\overset{\mathrm{H}}{|}}{\underset{|}{\mathrm{C}=\mathrm{O}}}}$$

N-methyl-N-[beta-(gamma'-cyanopropylsulfinyl) ethyl] formamide $$\underset{\mathrm{CH_3N-CH_2CH_2SO_2CH_2CH_2CH_2CN}}{\overset{\overset{\mathrm{H}}{|}}{\underset{|}{\mathrm{C}=\mathrm{O}}}}$$

N-methyl-N-[beta-(gamma'-cyano-propylsulfonyl) ethyl] formamide $$\underset{\mathrm{NC-CH_2CH_2}}{\overset{\mathrm{CH_3SO_2CH_2SCH_2CH_2}}{\mathrm{N-\overset{O}{\overset{\|}{C}}H}}}$$

N-(beta-cyanoethyl)-N-[beta-(beta'-sulfoethylthio) ethyl] formamide, methyl ester $$\underset{\mathrm{NC-CH_2CH_2}}{\overset{\mathrm{CH_3SO_2CH_2SOCH_2CH_2}}{\mathrm{N-\overset{O}{\overset{\|}{C}}-H}}}$$

N-(beta-cyanoethyl)-N-[beta-(beta'-sulfoethyl sulfinyl) ethyl] formamide, methyl ester $$\underset{\mathrm{NC-CH_2CH_2}}{\overset{\mathrm{CH_3SO_2CH_2SO_2CH_2CH_2}}{\mathrm{N-\overset{O}{\overset{\|}{C}}-H}}}$$

N-(beta-cyanoethyl)-N-[beta-(beta'-sulfoethylsulfonyl) ethyl] formamide, methyl ester $$\underset{\mathrm{CH_3}}{\overset{\mathrm{NCS-CH_2CH_2}}{\mathrm{N-\overset{O}{\overset{\|}{C}}-H}}}$$

N-methyl-N-beta-thiocyanoethyl formamide $$\underset{\mathrm{NC-CH_2CH_2}}{\overset{\mathrm{(CH_3)_2NCOCH_2CH_2SCH_2CH_2}}{\mathrm{N-\overset{O}{\overset{\|}{C}}-H}}}$$

N-(beta-cyanoethyl)-N-[beta-(beta'-(N',N'-dimethylcarbamyl) ethylthio)-ethyl] formamide $$\underset{\mathrm{NC-CH_2CH_2}}{\overset{\mathrm{(CH_3)_2NCOCH_2CH_2SOCH_2CH_2}}{\mathrm{N-\overset{O}{\overset{\|}{C}}-H}}}$$

N-(beta-cyanoethyl)-N-[beta-(beta'-(N',N'-dimethylcarbamyl) ethylsulfinyl) ethyl] formamide $$\underset{\mathrm{NC-CH_2CH_2}}{\overset{\mathrm{(CH_3)_2NCOCH_2CH_2SO_2CH_2CH_2}}{\mathrm{N-\overset{O}{\overset{\|}{C}}-H}}}$$

N-(beta-cyanoethyl)-N-[beta-(beta'-(N',N'-dimethylcarbamyl) ethylsulfonyl) ethyl] formamide $$\mathrm{H\overset{O}{\overset{\|}{C}}-N}\underset{\underset{\mathrm{CN}}{\mathrm{CH_2CH_2CHCON(CH_3)_2}}}{\overset{\mathrm{CH_2CH_2SCN}}{}}$$

N-(beta-thiocyanoethyl)-N-[gamma-cyano-gamma (N',N'-dimethylcarbamyl) propyl] formamide $$\mathrm{H\overset{O}{\overset{\|}{C}}-N}\underset{\mathrm{CH_2CH_2SCH_2CH_2CON(CH_3)_2}}{\overset{\mathrm{CH_2CH_2SCN}}{}}$$

N-(beta-thiocyanoethyl)-N-[beta-(beta'-(N',N'-dimethylcarbamyl) ethylthio) ethyl] formamide $$\mathrm{H\overset{O}{\overset{\|}{C}}-N}\underset{\underset{\mathrm{CN}}{\mathrm{CH_2CH_2CHCON(CH_3)_2}}}{\overset{\mathrm{CH_2CH_2SCH_2CH_2SCN}}{}}$$

N-[beta-(beta'-thiocyano-ethylthio) ethyl]-N-[gamma-cyano-gamma-(N',N'-dimethylcarbamyl) propyl] formamide

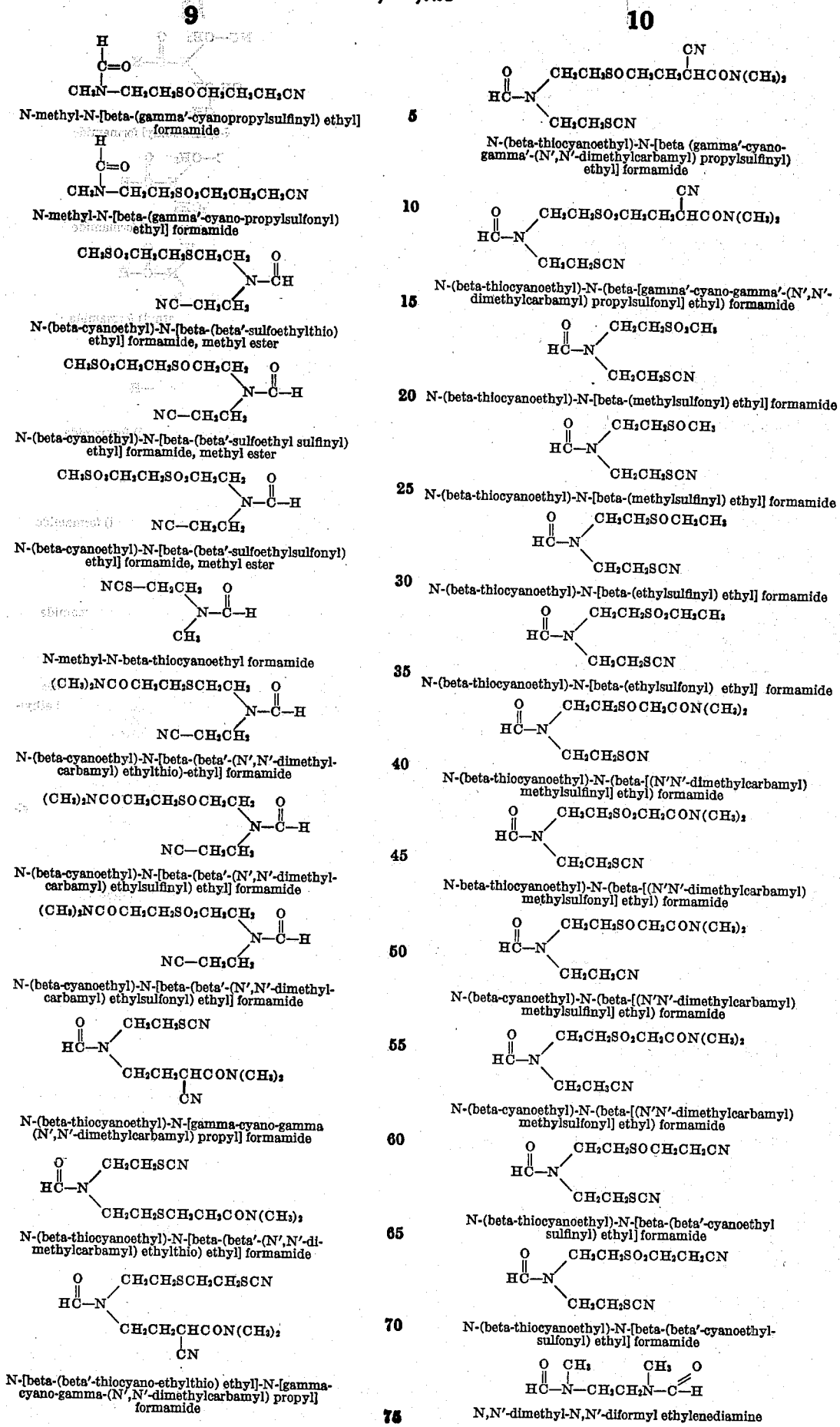

N-(beta-thiocyanoethyl)-N-[beta (gamma'-cyano-gamma'-(N',N'-dimethylcarbamyl) propylsulfinyl) ethyl] formamide N-(beta-thiocyanoethyl)-N-[beta-[gamma'-cyano-gamma'-(N',N'-dimethylcarbamyl) propylsulfonyl] ethyl) formamide N-(beta-thiocyanoethyl)-N-[beta-(methylsulfinyl) ethyl] formamide N-(beta-thiocyanoethyl)-N-[beta-(methylsulfonyl) ethyl] formamide N-(beta-thiocyanoethyl)-N-[beta-(ethylsulfinyl) ethyl] formamide N-(beta-thiocyanoethyl)-N-[beta-(ethylsulfonyl) ethyl] formamide N-(beta-thiocyanoethyl)-N-[beta-[(N'N'-dimethylcarbamyl) methylsulfinyl] ethyl] formamide N-beta-thiocyanoethyl)-N-(beta-[(N'N'-dimethylcarbamyl) methylsulfonyl] ethyl) formamide N-(beta-cyanoethyl)-N-(beta-[(N'N'-dimethylcarbamyl) methylsulfinyl] ethyl) formamide N-(beta-cyanoethyl)-N-(beta-[(N'N'-dimethylcarbamyl) methylsulfonyl] ethyl) formamide N-(beta-thiocyanoethyl)-N-[beta-(beta'-cyanoethyl sulfinyl) ethyl] formamide N-(beta-thiocyanoethyl)-N-[beta-(beta'-cyanoethyl-sulfonyl) ethyl] formamide $$\mathrm{H\overset{O}{\overset{\|}{C}}-\overset{\mathrm{CH_3}}{\overset{|}{N}}-CH_2CH_2\overset{\mathrm{CH_3}}{\overset{|}{N}}-\overset{O}{\overset{\|}{C}}-H}$$

N,N'-dimethyl-N,N'-diformyl ethylenediamine

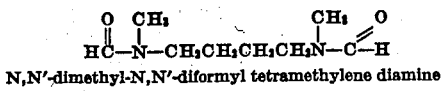
N,N'-dimethyl-N,N'-diformyl tetramethylene diamine

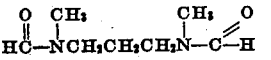
N,N'-dimethyl-N,N'-diformyl trimethylene diamine

Delta-(N-methyl, N-formyl amino)-valeronitrile

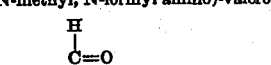
Gamma (N-methyl, N-formyl amino) butyronitrile

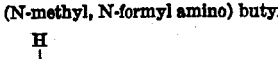
N-methyl-N-(gamma-ethyl-sulfinylpropyl) formamide

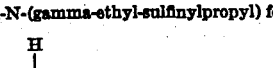
N-methyl-N-(gamma-ethyl-sulfonylpropyl) formamide

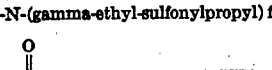
N,N-bis(gamma methylsulfinylpropyl) formamide

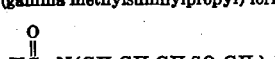
N,N-bis(gamma methylsulfonylpropyl) formamide

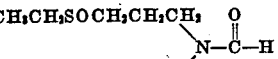
N-[gamma (ethylsulfinylpropyl] N-(gamma-cyanopropyl) formamide

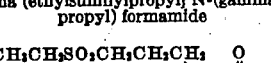
N-[gamma(ethylsulfonylpropyl]-N-(gamma-cyanopropyl) formamide

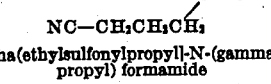
N-(beta-cyanoethyl)-N-(beta-hydroxyethyl) formamide

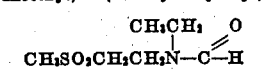
N-ethyl-N-(beta-methylsulfonyl-ethyl) formamide

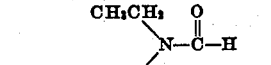
N-ethyl-N-(beta-methylsulfinylethyl) formamide

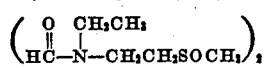
1,2-bis [beta-(N-formyl-N-ethyl) aminoethylsulfinyl] ethane

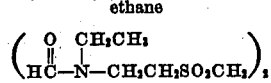
1,2-bis [beta-(N-formyl-N-ethyl) aminoethylsulfonyl] ethane

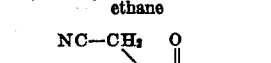
N-ethyl-N-cyanomethyl formamide

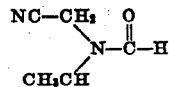
N-isopropyl-N-cyanomethyl formamide

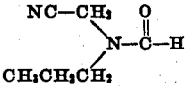
N-n-propyl-N-cyanomethyl formamide

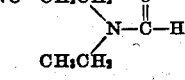
N-ethyl-N-(beta-cyanoethyl) formamide

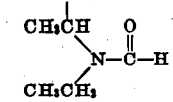
N-ethyl-N-(alpha-cyanoethyl) formamide

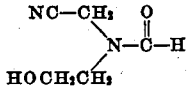
N-cyanomethyl-N-(beta-hydroxy-ethyl) formamide

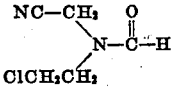
N-cyanomethyl-N-(beta-chloro-ethyl) formamide

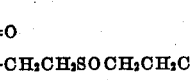
N-ethyl-N-[beta-(beta'-(N',N'-dimethylcarbamyl) ethylsulfinyl) ethyl] formamide

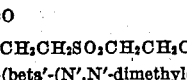
N-ethyl-N-[beta-(beta'-(N',N'-dimethylcarbamyl) ethylsulfonyl) ethyl] formamide

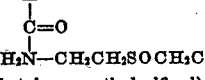
N-ethyl-N-[beta-(beta'-cyano-ethylsulfinyl) ethyl] formamide

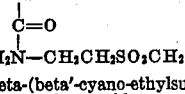
N-ethyl-N-[beta-(beta'-cyano-ethylsulfonyl) ethyl] formamide

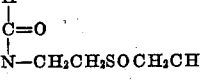
N-ethyl-N-[beta-(gamma'-cyano-propylsulfinyl) ethyl] formamide

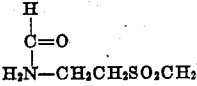
N-ethyl-N-[beta-(gamma'-cyano-propylsulfonyl) ethyl] formamide

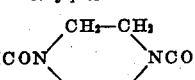
N,N' diformyl piperazine

Acrylonitrile polymer solutions formed by the use of solvents embraced by the formula set forth above are stable at room temperature (approximately 20° C.) and at temperatures considerably above room temperature. Shaped structures and articles can be produced by extruding many of such solutions into an evaporative or coagulative medium. By forming the structures in an evaporative medium, the solvent must be evaporated therefrom and by forming the structures in a coagulative medium, the solvent should be removed by selective solution in a non-solvent for the polymer.

The solutions are prepared by dissolving the polyacrylonitrile, or copolymer or interpolymer of acrylonitrile with one or a mixture of the above-mentioned solvents. Some of these solvents are solid at ordinary temperatures and dissolve or retain the polymer in clear solution only at elevated temperatures, for example at temperatures of 100° C. or higher, below which temperature the composition resembles a gel. In all cases when the polymer is dissolved in a solvent of the above class, the resulting composition while hot has the appearance of a true solution. When cooled to room temperature, the composition generally takes on the appearance of a gel, which gel may, on standing, undergo syneresis. Reheating of this gel or syneresed mass however causes it to again return to solution form.

In view of the relatively high melting points of some of the solvents of this invention, they would have comparatively little use in the production of a polyacrylonitrile spinning or casting solution. Such solvents are, however, excellent solvent plasticizers for polyacrylonitrile since they are soluble in a wide range of proportions with the said acrylonitrile polymers. The present invention therefore contemplates solid solutions of acrylonitrile polymers containing at least 85% by weight of acrylonitrile as well as liquid solutions thereof.

Shaped articles obtained from solvent solutions of polyacrylonitrile in accordance with the invention and from which the solvent is subsequently removed are substantially free of foreign matter and voids and substantially undecomposed and chemically unchanged from the simple polymer prior to its solution.

The above-described organic solvent solutions of acrylonitrile polymer may be shaped in the form of filaments, yarns, films, tubes and like structures by apparatus and processes generally known in the art, the detailed operating conditions being suitably modified.

Suitable methods and apparatus for the production of shaped articles of the polymers of this invention will be readily apparent by reference to the following detailed description when taken in connection with the accompanying illustrations in which:

Figure 1 is a diagrammatic vertical sectional view showing a dry spinning cell suitable for use in accordance with the invention;

Figure 2 is a diagrammatic perspective view showing a yarn drawing device for use in connection with the invention;

Figure 3 is a diagrammatic perspective view showing a wet spinning apparatus for use in the invention; and Figure 4 is a diagrammatic side elevational view showing a suitable film casting apparatus for use in accordance with the invention.

Referring to Figure 1 of the drawing, reference numeral 11 designates a spinneret through which a plurality of filaments 15 are formed by extruding a filament-forming solution supplied to the spinneret by means of conduit 13. The spinning cell is jacketed with a material 17 such as a refractory in which is embedded an electrical heating coil 19. The spinning cell can thus be operated at any desired temperature. A plurality of conduits 21 are provided adjacent the bottom of the device for passing evaporative medium through the cell so as to evaporate the solvent from the extruded filaments 15. The evaporative medium is removed from the cell through outlet openings 23. The yarn comprising the plurality of filaments 15 is passed from the bottom of the spinning cell around guide roller 25 and is wound on a bobbin 27.

Referring to Figure 2 of the drawing, the yarn 15 is removed from the bobbin package 27 and passed about draw roller 29 and separating roller 31. From draw roller 29, the yarn is passed to a second draw roller 33 and separating roller 35. The yarn is passed around the two sets of draw rollers including their separating rollers a sufficient number of turns to prevent slippage of the yarn. Draw roller 33 is rotated at a greater speed, for example three to ten times the speed of draw roller 29. In this manner, the yarn 15 is stretched between the two draw rollers. As the yarn passes between the two draw rollers, a heating medium is brought into contact with the yarn through blower nozzles 37 and 39. The yarn passing from the draw roller 33 is wound on bobbin 41. The drawing or stretching of the spun yarn as described is not claimed as part of the present invention, but is claimed in the copending application of Daniel T. Meloon, Serial No. 496,397, filed July 28, 1943.

Figure 3 of the drawing illustrates a wet spinning apparatus for the production of yarn. The acrylonitrile polymer solution is passed through conduit 51 and is extruded through spinneret 53 to form a multifilament yarn 54. The yarn 54 is passed about guide roller 57 which is positioned within the coagulating liquid in tank 55. The yarn is then passed about guide roller 59 and is wound on bobbin 61.

The organic solvent solution of polyacrylonitrile may be cast in the form of a film as illustrated in Figure 4. In accordance with this apparatus, the polymer solution is passed from hopper 71 on to the endless steel band 73 where it is smoothed by means of a doctor knife 75. The band, together with the film, is passed under a means 77 for bringing a heated drying medium into contact with the film. The film 81 is pulled from the band 73 and collected on a mill roll 83.

The polyacrylonitrile for use with the invention is preferably prepared by the ammonium persulfate catalyzed polymerization of monomeric acrylonitrile dissolved or emulsified in water. It can, however, be prepared by any other suitable type of polymerization reaction such as, for example, the emulsion type reaction disclosed by U. S. Patent No. 2,160,054 to Bauer et al. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \dfrac{\text{viscosity of solution}}{\text{viscosity of solvent}} - 1$ and $C$ = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. For example, polyacrylonitrile, having a molecular weight of approximately 60,000 can be prepared as follows: To 94 pounds of distilled water heated to 40° C. add 40 grams of ammonium persulfate catalyst and 80 grams of sodium bisulfite activator. Then add 16 pounds of acrylonitrile slowly with stirring over a period of two hours. The polyacrylonitrile having the above said molecular weight will precipitate from the solution. Increasing or decreasing the amount of the catalyst, while maintaining the other conditions constant, decreases or increases the molecular weight of the polymer. Acrylonitrile copolymers and interpolymers containing at least 85% by weight of acrylonitrile and likewise preferably having a molecular weight of 15,000 to 250,000 or higher can be prepared in a similar manner.

The following examples in which parts, proportions and percentages are by weight unless otherwise specified illustrate preferred methods of preparing solutions of polymers in accordance with the principles of this invention and of employing these solutions in the manufacture of commercially satisfactory shaped articles of the polymer. The invention is not to be limited by the details set forth in the examples.

Example I

Fifteen (15) parts of a polyacrylonitrile prepared by the polymerization of monomeric acrylonitrile in accordance with the teachings of U. S. Patent No. 2,160,054 to Bauer et al. and possessing an average molecular weight of 120,000 as determined by the Staudinger equation from viscosity data are ground to an average particle size of 200 mesh and mixed with 85 parts of N-beta-cyanoethyl-N-methyl formamide, the resulting mixture being heated within a period of fifteen minutes to a temperature of 150° C. to form a clear, viscous solution which may be used at this temperature for the casting of films. If subsequently cooled, the solution becomes more viscous.

The solution was heated to a temperature of 175° C., cast on to a surface heated to 175° C. and dried to form a thin, transparent film of acrylonitrile polymer, the film being tough, flexible and tear resistant.

Example II

Twenty (20) parts of a copolymer consisting of 90% of acrylonitrile and 10% of vinyl thiolacetate prepared by the aqueous emulsion polymerization of acrylonitrile and vinyl thiolacetate in the presence of 0.5% ammonium persulfate were dissolved in 80 parts of N,N'-dimethyl-N,N'-diformyl tetramethylene diamine by warming. The resulting clear solution was extruded at a temperature of 175° C. into a bath comprising glycerol heated to 150° C. to form a 15-filament yarn having a total denier of 150. A bath travel of 24 inches was employed, the yarn being subjected to a tension of 0.7 gram per denier (based on the final yarn denier) during its travel through the bath. The solvent was removed from the yarn by the glycerol, thereby coagulating the copolymer.

Example III

Seventy-five (75) parts of the powdered polyacrylonitrile of Example I were intimately mixed with 25 parts of solid N,N'-diformyl piperazine and heated to a temperature of 170° C., to form a viscous, homogeneous mass or solution. Subsequent cooling of this solution to room temperature resulted in the formation of a gel-like mass of high viscosity which could be molded to a strong, tough, rod-like structure.

As indicated in the above examples, it is possible by the practice of this invention to obtain a solution of polyacrylonitrile, or a copolymer or interpolymer of acrylonitrile which is eminently suited for use in the manufacture of shaped articles such as yarns, films, or molded articles. These solutions are also suited for use as lacquers or coating compositions. They are especially useful in the coating of wire and electrical parts where the high chemical and electrical resistance of the polymer is important.

For the purpose of definition, a solvent is a material which, when in the liquid state, is capable of forming solutions in which the polymer is present in a concentration by weight of 5% or more. In most instances, the polymer is soluble in almost all proportions although the miscibility may take place at elevated temperatures in the case of certain compounds.

As also shown, the solvents of the invention are useful not only in connection with polyacrylonitrile, but also with copolymers and interpolymers of acrylonitrile and other polymerizable substances such as, for example, compounds containing one or more ethylenic linkages including vinyl and acrylic compounds as well as olefinic or diolefinic hydrocarbons such as isobutylene, butadiene, etc. They are eminently satisfactory for use with those polymers that contain an appreciable amount of acrylonitrile, for example, polymers, copolymers and interpolymers that contain at least 85% by weight of acrylonitrile and that have generally been regarded by the art as being completely insoluble in all common organic solvents. Nor are these solvents limited to use with a polyacrylonitrile of any given molecular weight. They can be used with a polymer of almost any given molecular weight and are especially satisfactory for use with those polymers having an average molecular weight within the range 15,000 to 250,000 as determined by viscosity data using the Staudinger equation and intended for use in the manufacture of yarns or films.

The solution of acrylonitrile polymer dissolved in an organic solvent in accordance with this invention must be of such a concentration that its viscosity at the operating temperature is within a workable range. When it is to be employed in the spinning of yarn or the casting of film, the solution should preferably have a viscosity within the range 25 to 750 poises. When the polymer has a molecular weight of 250,000 or more, this requires that the maximum concentration of polymer in the spinning solution be of the order of 10%. Generally, it is preferred that the spinning solution contain at least 10% of the polymer because of the difficulty of rapidly removing large amounts of solvent from the solution in the spinning operation. Moreover, it is economically undesirable to use such large amounts of solvent for the spinning of a given amount of polymer although it is true that the solvent can be completely recovered from the spinning operation and reused. For these reasons, it is preferred to employ a polymer having an average molecular weight of between 40,000 and 150,000 since such a polymer forms a solution of the desired viscosity in concentrations of the order of 15% to 25% and at a desirable spinning temperature of the order of 100° to 150° C. Of course, it is within the scope of the invention to heat the solution to a higher temperature, even to above the normal boiling point of the solvent, for the actual spinning operation. Here again, the controlling factor with regard to the temperature of the spinning solution is the viscosity of the solution.

The evaporative medium employed in the dry spinning of filaments and yarns or the dry casting of films in accordance with this invention may be any vapor inert to the film- or filament-forming solution such as air, nitrogen, steam, etc., or any suitable mixture thereof. The temperature of the evaporative medium is dependent on such factors as the dimensions of the spinning cell, the composition and rate of extrusion of the spinning solution and the rate of flow of the evaporative medium. It is only necessary that these several factors be so correlated that the yarn or other shaped article leaving the spinning cell be sufficiently freed of the solvent so that it is solidified and capable of being wound into package form or otherwise collected.

As indicated in Example II above, shaped articles of acrylonitrile polymer can also be formed by extruding the spinning solution into a suitable precipitating bath comprising a liquid that is miscible with the solvent but is a chemically inert non-solvent for the acrylonitrile polymer. As examples of such a liquid may be mentioned water, glycerin, organic solvents such as alcohol, ether, etc., or aqueous solutions of salts, alkalies or acids. The copending application of William W. Watkins, Serial No. 496,376, filed July 28, 1943, covers the use of glycerol and aqueous solutions of salts as baths, preferably at elevated temperatures, for the wet spinning of acrylonitrile polymer yarn, from solutions of the polymer, preferably with substantial tension and stretch being applied during spinning.

The article of acrylonitrile polymer thus obtained can advantageously be subjected to a stretching operation of the type employed in the above examples. This stretching is preferably performed by passing the yarn between two positively driven rollers, the peripheral speeds of which are so adjusted that the article is stretched from two to ten times its original length, preferably approximately six times its original length. This stretching of the formed article may be performed at any suitable time. However, in the case of articles formed by the wet spinning or casting technique, it is preferably performed before the article has been completely dried. The orientation of the structure thus obtained improves the physical properties of the structure including its tenacity, its resilience, etc.

This stretching of the shaped article can also be accomplished by causing the article, while passing between stretching rollers, to contact a heated stationary pin or to pass through an inert medium such as air, water, glycerin, etc., heated to a high temperature. Obviously, the article must not be exposed to this high temperature for a period sufficiently long to decompose the polymer. In general however, the time of contact of the article with the heated medium is so short that temperatures up to 250° C. can be employed. Although it is generally preferred to heat the article to a temperature of at least 100° C. during the stretching operation, this is not essential. Desirable results can be obtained by stretching the article without the application of heat, for example by stretching at room temperature.

In addition to acting as solvents for polyacrylonitrile, or copolymers of acrylonitrile, the aliphatic or arylaliphatic nitrile compounds of this invention, when present in small amounts, can also be used as plasticizing agents for the polymer and the higher boiling compounds of the invention are especially suited for such use. At the same time, it is, of course, to be understood that non-solvent softeners, such as glycerol, can also be incorporated in the solutions of the invention, these materials remaining in the subsequently formed articles to impart a softening effect. If it is desired to use such plasticizing or softening agents with polyacrylonitrile, they are preferably added in the desired amount to an already formed solution of the polymer in a lower boiling solvent, for example to a solution of the polymer in dimethyl formamide.

This invention is primarily concerned with the steps of dissolving polyacrylonitrile in a suitable solvent to form a stable solution adapted for use in the manufacture of shaped articles of polyacrylonitrile. It is characteristic of the invention that the solutions provided by it are stable; the solvents do not cause a decomposition or chemical alteration of the dissolved acrylonitrile polymer. At the same time, it is also characteristic that the solvents provided by the invention are also useful in the dissolving of mixtures of polyacrylonitrile and adjuvants such as dye modifiers, linear polyamides such as nylon, derivatives of cellulose including cellulose ethers and esters, polymers of vinyl compounds such as vinyl chloride, vinyl acetate, acrylic acid, etc., which adjuvants may be incorporated in the acrylonitrile polymer solution to modify the properties, both chemical and physical, of the resulting shaped articles.

This invention provides a class of solvents for polyacrylonitrile, and copolymers and interpolymers of acrylonitrile which were heretofore considered substantially insoluble. The solvents are capable of forming with the polymer clear solutions that are stable for extended periods of time and are admirably suited for use as lacquers or coating compositions or in the manufacture of shaped articles of the polymer, for example by extrusion into an evaporative or coagulative medium, or by the use of a molding technique.

The invention also provides a class of materials that is eminently suited for use in plasticizing structures comprising the acrylonitrile polymers. The materials provided by this invention are apparently true solvents for the above-mentioned acrylonitrile polymers. They do not tend to react with or decompose the polymer, the polymeric material obtained from the solution of this invention apparently being the same identical chemical composition as the initial polymer.

Yarns, films and similar articles of polyacrylonitrile prepared from the solutions of this invention can be stretched to yield oriented structures that possess a high tenacity, a desirable elongation and a high elastic recovery that compares favorably with that of silk. The articles are not contaminated with undesirable salts and they are substantially free of void spaces.

Reference throughout the specification and claims, to acrylonitrile polymers, polymers of acrylonitrile, and co-polymers and interpolymers of acrylonitrile "containing at least 85% by weight of acrylonitrile" signifies polymers containing in their molecules at least 85% by weight of the acrylonitrile unit which is considered to be present in the polymer molecule as the group

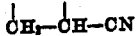

that is, at least 85% by weight of the reactant material converted into and forming the polymer is acrylonitrile.

Since it is obvious that many changes and modifications can be made in the above described details without departing from the nature and spirit of the invention, it is to be understood that the invention is not to be limited to the details

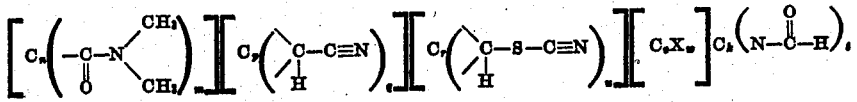

described herein except as set forth in the appended claims.

I claim:

1. As a new composition of matter, a polymer of acrylonitrile containing in the polymer molecule at least 85% by weight of acrylonitrile dissolved in an organic compound embraced by the formula:

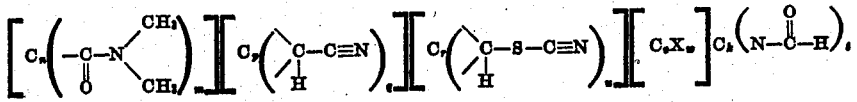

wherein X is a member of the class consisting of

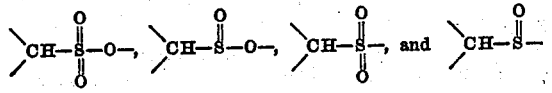

the free valences of the sulfoxy group being attached also to carbon; both valences of the nitrogen atom of the formyl imido group are attached to hydrocarbon carbon atoms; $t$ is an integer at least equal to 1; $m$, $q$, $u$, and $w$ are integers at least equal to zero; $m+q+u+w+t$ is at least equal to 2; $n$, $p$, $r$, $v$ and $k$ are integers at least equal to zero; $k/t$ does not exceed 3; $v/w$ does not exceed 2; $r/u$ does not exceed 0.5; $p/q$ does not exceed 1.5 and $n/m$ does not exceed 1.5, all valences of said compound other than those contained in carbon-to-carbon linkages and not shown as satisfied in the formula being satisfied by a substituent taken from the group consisting of hydrogen, halogen, oxygen, bivalent sulfur, hydroxyl, thiol, cyano, thiocyano and sulfoxy; the total number of such halogen, oxygen, sulfur, hydroxyl and thiol substituents not exceeding one half $m+q+u+w+t$ and the total number of cyano, thiocyano and sulfoxy substituents not exceeding $m+q+u+w+t$.

2. A new composition of matter as defined in claim 1, in which the polymer is polyacrylonitrile.

3. A new composition of matter as defined in claim 1, in which the polymer has a molecular weight of between 15,000 and 250,000.

4. A new composition of matter as defined in claim 1, in which the polymer has a molecular weight of between 40,000 and 150,000.

5. A new composition of matter as defined in claim 1, in which the polymer solution has a viscosity within the range 25 to 750 poises.

6. As a new composition of matter, a polymer of acrylonitrile containing in the polymer molecule at least 85% by weight of acrylonitrile dissolved in N-beta-cyanoethyl-N-methyl formamide.

7. As a new composition of matter, a polymer of acrylonitrile containing in the polymer molecule at least 85% by weight of acrylonitrile and an organic compound embraced by the formula:

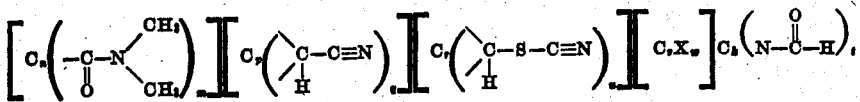

wherein X is a member of the class consisting of

the free valences of the sulfoxy group being attached also to carbon; both valences of the nitrogen atom of the formyl imido group are attached to hydrocarbon carbon atoms; $t$ is an integer at least equal to 1; $m$, $q$, $u$ and $w$ are integers at least equal to zero; $m+q+u+w+t$ is at least equal to 2; $n$, $p$, $r$, $v$ and $k$ are integers at least equal to zero; $k/t$ does not exceed 3; $v/w$ does not exceed 2; $r/u$ does not exceed 0.5; $p/q$ does not exceed 1.5 and $n/m$ does not exceed 1.5, all valences of said compound other than those contained in carbon-to-carbon linkages and not shown as satisfied in the formula being satisfied by a substituent taken from the group consisting of hydrogen, halogen, oxygen, bivalent sulfur, hydroxyl, thiol, cyano, thiocyano and sulfoxy; the total number of such halogen, oxygen, sulfur, hydroxyl and thiol substituents not exceeding one half $m+q+u+w+t$ and the total number of cyano, thiocyano and sulfoxy substituents not exceeding $m+q+u+w+t$.

8. The composition of claim 1 in which the solution contains at least 10% of said polymer of acrylonitrile.

9. The composition of claim 1 in which the polymer of acrylonitrile is polyacrylonitrile having a molecular weight between 15,000 and 250,000.

10. The composition of claim 1 in which the polymer of acrylonitrile is polyacrylonitrile having a molecular weight between 40,000 and 150,000.

11. The composition of claim 6 in which the polymer of acrylonitrile is polyacrylonitrile.

RICHARD R. MERNER.

Certificate of Correction

Patent No. 2,404,723.  July 23, 1946.

RICHARD R. MERNER

It is hereby certified that errors appear in the printed specification of the above numbered patent requiring correction as follows: Column 2, line 41, for "pyridinum" read *pyridinium*; column 5, lines 32 to 34 and column 19, lines 27 to 29 inclusive, right hand portion of the formula, for the last five indistinct subletters read $u$, $v$, $w$, $k$ and $t$ respectively; column 5, lines 30 to 32, right hand portion of the formula, for

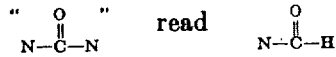

column 7, line 56, for "aminoethyl)" read *aminoethyl]*; column 10, line 57, for "CH₂CH₂CN" read $CH_2CH_2CN$; column 20, line 17, in the formula, for the indistinct subletter before the last double bracket read $u$; line 15, same formula, after "C" between the last pair of brackets, for the indistinct subletter read $v$; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*